United States Patent
Noda (10) Patent No.: US 9,596,340 B2
(45) Date of Patent: Mar. 14, 2017

(54) MOBILE ELECTRONIC DEVICE, CONTROL METHOD, AND COMPUTER PROGRAM PRODUCT

(71) Applicant: KYOCERA Corporation, Kyoto-shi, Kyoto (JP)

(72) Inventor: Keiichi Noda, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 14/942,973

(22) Filed: Nov. 16, 2015

(65) Prior Publication Data

US 2016/0072944 A1 Mar. 10, 2016

Related U.S. Application Data

(63) Continuation of application No. PCT/JP2014/062741, filed on May 13, 2014.

(30) Foreign Application Priority Data

May 17, 2013 (JP) ................................ 2013-105483

(51) Int. Cl.
*H04M 1/72* (2006.01)
*H04M 1/725* (2006.01)

(52) U.S. Cl.
CPC ... *H04M 1/72597* (2013.01); *H04M 1/72519* (2013.01); *H04M 1/72563* (2013.01)

(58) Field of Classification Search
CPC ....................................................... H04M 1/72
USPC .......................................................... 455/566
See application file for complete search history.

(56) References Cited

U.S. PATENT DOCUMENTS

| 8,816,980 B2* | 8/2014 | Kanda | G06F 1/3215 345/173 |
| 2007/0197175 A1* | 8/2007 | Yoo | H04M 1/0214 455/158.4 |
| 2011/0219334 A1* | 9/2011 | Park | H04M 1/72583 715/808 |

FOREIGN PATENT DOCUMENTS

| JP | 2000-209698 A | 7/2000 |
| JP | 2012-29207 A | 2/2012 |
| JP | 2012-95286 A | 5/2012 |

OTHER PUBLICATIONS

International Search Report mailed Aug. 12, 2014, corresponding to International application No. PCT/JP2014/062741.

* cited by examiner

*Primary Examiner* — Michael T Vu
(74) *Attorney, Agent, or Firm* — Hauptman Ham, LLP (57) ABSTRACT

A mobile electronic device includes a communication unit, a display, and a controller. The communication unit performs communication for a phone call. The display displays a first screen during the phone call made by the communication unit. The controller causes a second screen different from the first screen to be displayed on the display when the display of which display is turned off is to be re-displayed during the phone call after the display of the first screen is turned off during the phone call.

9 Claims, 8 Drawing Sheets

MOBILE ELECTRONIC DEVICE, CONTROL METHOD, AND COMPUTER PROGRAM PRODUCT

CROSS-REFERENCE TO RELATED APPLICATION

This application is a Continuation of PCT international application Ser. No. PCT/JP2014/062741 filed on May 13, 2014 which designates the United States, incorporated herein by reference, and which is based upon and claims the benefit of priority from Japanese Patent Applications No. 2013-105483 filed on May 17, 2013, the entire contents of which are incorporated herein by reference.

FIELD

Embodiments of the present disclosure relates to a mobile electronic device, a control method, and a computer program product.

BACKGROUND

Some mobile electronic devices such as a mobile phone and a smartphone implement various functions related to a phone call by controlling its own device. For example, Japanese Laid-open Patent Publication No. 2000-209698 discloses a mobile set with a sound correction function (sound quality adjustment function) for correcting the frequency characteristic and the level of a sound output from a receiver or the like according to age-related auditory changes.

A phone call is a communication performed in real time with the counterpart on the phone call, and it is therefore preferred that keeping the counterpart waiting and accidentally ending the call or the like are prevented as much as possible. Because of this, it is very important for an operation screen related to the phone call to reduce an erroneous operation while allowing a quick operation. Therefore, the configuration of the operation screen related to the phone call is generally simple.

SUMMARY

A mobile electronic device according to an embodiment comprises: a communication unit configured to perform communication for a phone call; a display configured to display a first screen during a phone call made by the communication unit; and a controller configured to cause a second screen different from the first screen to be displayed when the display of which display is turned off is to be re-displayed during the phone call after the display of the first screen is turned off during the phone call.

A control method of a mobile electronic device that includes a communication unit and a display according to an embodiment comprises: performing communication for a phone call made by the communication unit; displaying a first screen on the display during the phone call made by the communication unit; turning off display of the display, where the first screen appears, during the phone call; and causing a second screen different from the first screen to be displayed when the display of which display is turned off is to be re-displayed during the phone call.

A computer program product according to an embodiment having computer instructions, stored on a non-transitory computer readable storage medium, for enabling a computer of a mobile electronic device including a communication module and a display executing the computer instructions to perform operations comprises: performing communication for a phone call made by the communication unit; displaying a first screen on the display during the phone call made by the communication unit; turning off display of the display, where the first screen appears, during the phone call; and causing a second screen different from the first screen to be displayed when the display of which display is turned off is to be re-displayed during the phone call.

DETAILED DESCRIPTION

Exemplary embodiments for implementing a present disclosure will be explained in detail with reference to the accompanying drawings. A smartphone will be explained below as an example of the mobile electronic device.

Embodiments

An embodiment is one of embodiments.

Figure 1:
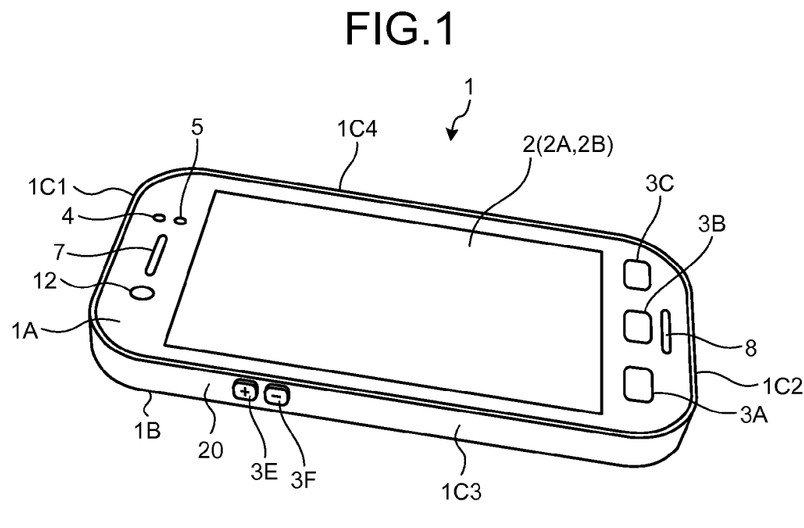
FIG. 1 is a perspective view of a smartphone according to an embodiment.
Figure 2:
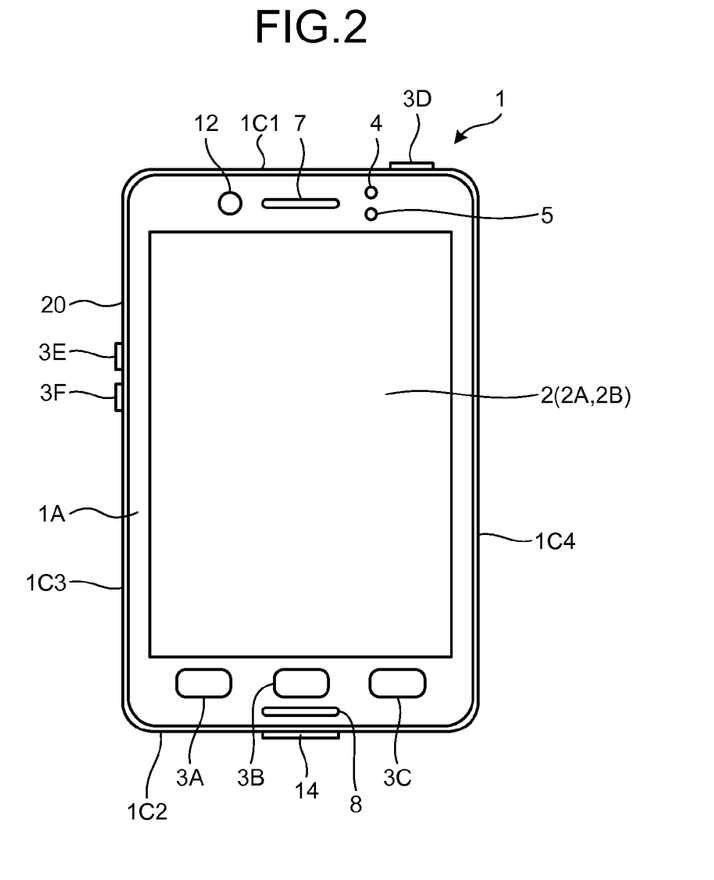
FIG. 2 is a front view of a smartphone according to an embodiment.
Figure 3:
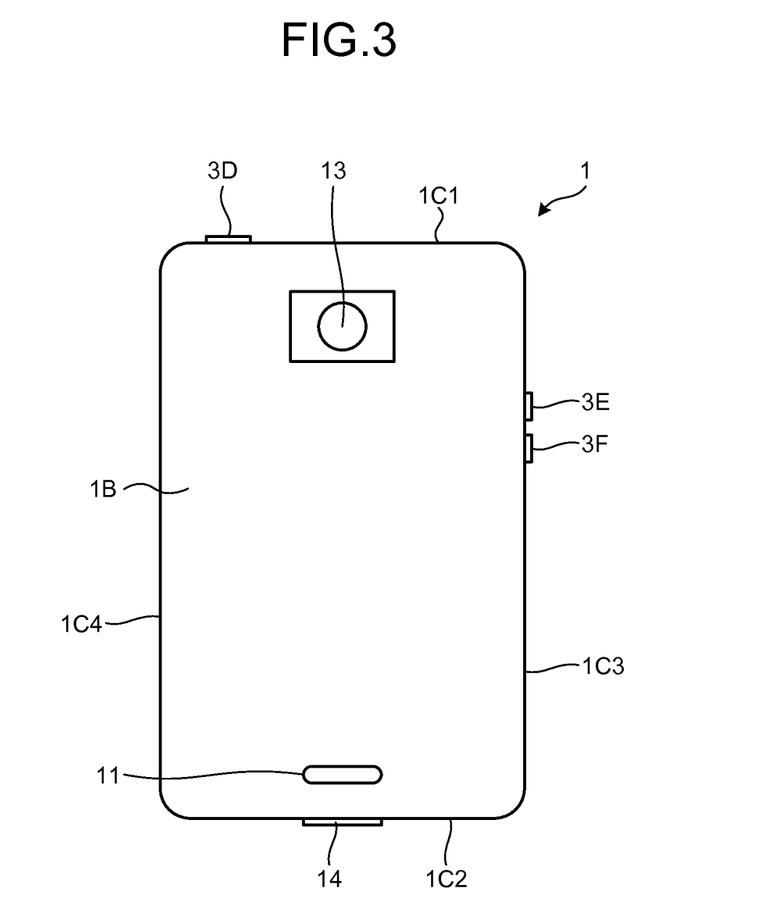
FIG. 3 is a back view of a smartphone according to an embodiment.

The overall configuration of a smartphone 1 according to an embodiment will be explained with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 has a touch screen display 2, buttons 3A to 3C, an illumination sensor 4, a proximity sensor 5, a receiver 7, a microphone 8, and a camera 12, which are provided in the front face 1A. The smartphone 1 has a speaker 11 and a camera 13 provided in the back face 1B. The smartphone 1 has buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In an example of FIG. 1, each of the display 2A and the touch screen 2B is a substantially rectangular shape: however, the shape of the display 2A and the touch screen 2B is not limited thereto. The display 2A and the touch screen 2B can be any shape such as a square or a circle. In an example of FIG. 1, the display 2A and the touch screen 2B are arranged in a superimposed manner; however, the arrangement of the display 2A and the touch screen 2B is not limited thereto. The display 2A and the touch screen 2B may be arranged, for example, side by side or apart from each other. In an example of FIG. 1, longer sides of the display 2A are along longer sides of the touch screen 2B respectively, and shorter sides of the display 2A are along shorter sides of the touch screen 2B respectively; however, the manner in which the display 2A and the touch screen 2B are superimposed is not limited thereto. If the display 2A and the touch screen 2B are arranged in the superimposed manner, for example, one or more sides of the display 2A do not have to be along any of the sides of the touch screen 2B.

The display 2A includes a display device such as an LCD (Liquid Crystal Display), an GELD (Organic Electro-Luminescence Display), or an IELD (Inorganic Electro-Luminescence Display). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the following explanation, the finger, the pen, the stylus pen, or the like that is in contact with the touch screen 2B may be called "contact object" or "contact thing".

The detection method of the touch screen 2B may be any detection method of a capacitive type detection method, a resistive type detection method, a surface acoustic wave type (or ultrasonic type) detection method, an infrared type detection method, an electromagnetic induction type detection method, and a load sensing type detection method. In the description herein below, for the sake of its simplicity, it is assumed that a user uses his/her finger(s) to make contact with the touch screen 2B in order to operate the smartphone 1.

The smartphone 1 determines a type of a gesture based on at least one of a contact detected by the touch screen 2B, a position where the contact is detected, a change in the position where the contact is detected, an interval at which the contact is detected, and the number of times when the contact is detected. The gesture is an operation performed on the touch screen 2B. Examples of the gesture determined by the smartphone 1 include, but are not limited to, touch, long touch, release, swipe, tap, and double tap.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object is displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi-touch gesture". The multi-touch gesture includes, for example, a pinch in and a pinch out. A tap, a flick, a swipe, and the like are a single touch gesture when performed by using a finger, and are a multi-touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of its simplicity, the fact that the touch screen 2B detects the contact(s) and then the smartphone 1 determines the type of the gesture as X based on the detected contact(s) may be simply described as "the smartphone detects X" or "the controller detects X".

Figure 4:
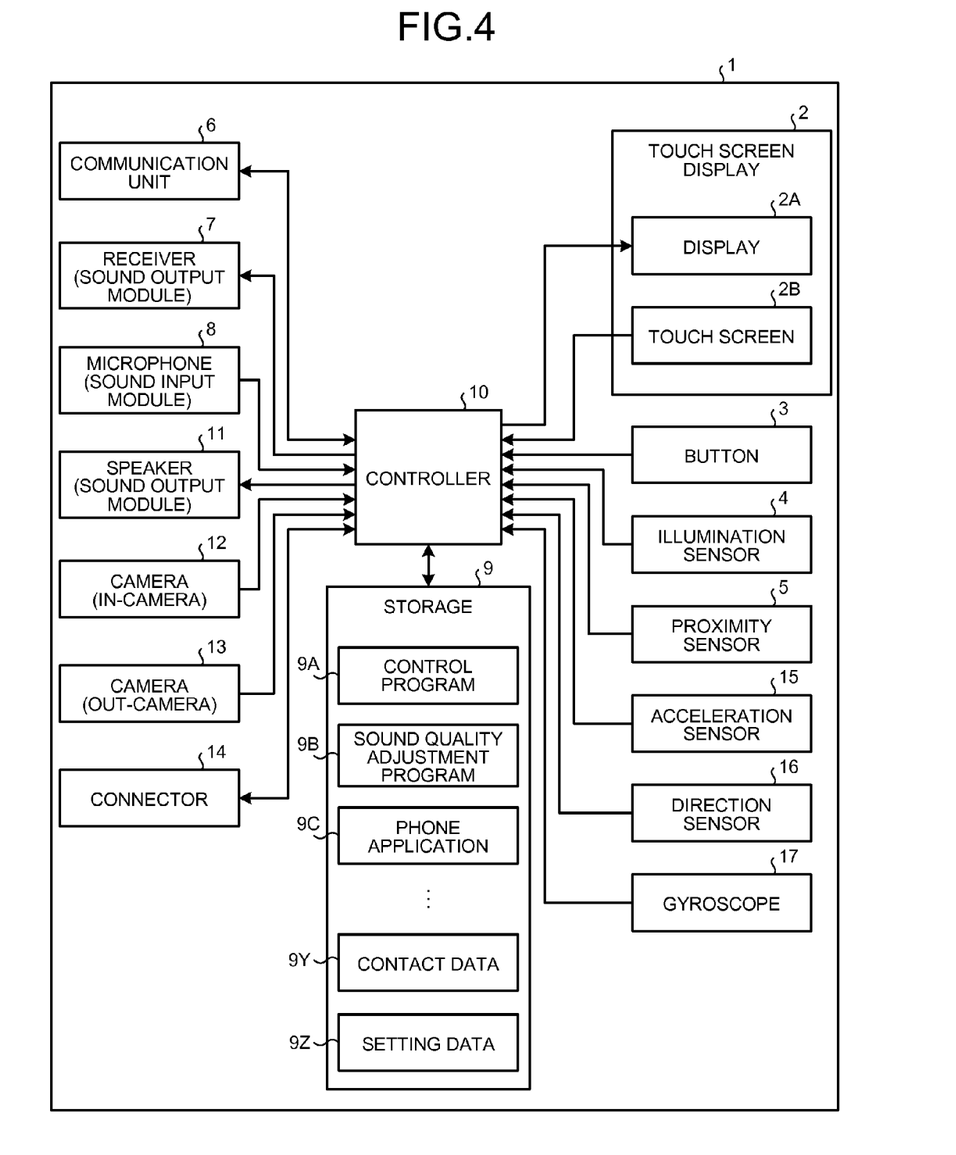
FIG. 4 is a block diagram of a smartphone according to an embodiment.

FIG. 4 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed on the smartphone 1. Specifically, the controller 10 detects an operation (a gesture) for the touch screen 2B (touch screen display 2) in cooperation with the touch screen 2B.

The button 3 is operated by the user. The button 3 includes a button 3A to a button 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs wireless communication. A communication system supported by the communication unit 6 is wireless communication standard. The wireless communication standard includes, for example, a cellular-phone communication standard such as 2G, 3G, and 4G. The cellular-phone communication standard includes, for example, LTE (Long Term Evolution), W-CDMA (Wideband Code Division Multiple Access), CDMA 2000, PDC (Personal Digital Cellular), GSM (registered trademark) (Global System for Mobile Communications), and PHS (Personal Handy-phone System). The wireless communication standard further includes, for example, WiMAX (Worldwide Interoperability for Microwave Access), IEEE 802.11, Bluetooth (registered trademark), IrDA (Infrared Data Association), and NFC (Near Field Communication). The communication unit 6 may support one or more of the communication standards.

The receiver 7 and the speaker 11 are sound output modules. The receiver 7 and the speaker 11 output a sound signal transmitted from the controller 10 as sound. The receiver 7 is used, for example, to output the counterpart's voice during a call. The speaker 11 is used, for example, to output a ringtone and music. Either one of the receiver 7 and the speaker 11 may double as the other function. The microphone 8 is a sound input module. The microphone 8 converts a user's voice or the like to a sound signal and transmits the sound signal to the controller 10.

The storage 9 stores programs and data. The storage 9 is used also as a work area that temporarily stores a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disk, or a magneto-optical disk with a reading device of the storage medium. The storage 9 may include a storage device used as a temporary storage area such as RAM (Random Access Memory).

Programs stored in the storage 9 include applications executed in the foreground or the background and a control program for assisting operations of the applications. The application causes, for example, a screen to be displayed on the display 2A and the controller 10 to perform processing according to a gesture detected through the touch screen 2B. The control program is, for example, an OS. The applications and the control program may be installed into the storage 9 through wireless communication by the communication unit 6 or through a non-transitory storage medium.

The storage 9 stores, for example, a control program 9A, a sound quality adjustment program 9B, a phone application 9C, contact data 9Y, and setting data 9Z. The sound quality adjustment program 9B provides a sound quality adjustment function for adjusting sound quality to be output. The phone application 9C provides a phone call function for making a phone call with other electronic device. The contact data 9Y includes information used by the user of the smartphone 1 to make a contact with other persons. The setting data 9Z includes information on various settings related to the operations of the smartphone 1.

The sound quality adjustment program 9B is used, for example, to adjust the sound quality of the counterpart's voice output during a call. The sound quality adjustment function provided in the sound quality adjustment program 9B includes, for example, a speech speed conversion function, a noise canceling function, and a sound range adjustment function. The speech speed conversion function is a function of using a silent interval to make a speech speed slower. The speech speed conversion function is implemented by buffering, for example, the counterpart's voice during a call, extending each pitch of intervals other than the silent interval of the buffered voice so as to fill the silent interval, and reproducing the voice. The noise canceling function reduces noise included in the sound signal transmitted from the counterpart. The noise canceling function is implemented by cutting or suppressing, for example, the signal of a frequency corresponding to the noise. The sound range adjustment function adjusts a volume for each sound range (frequency band) for a user who cannot catch a specific frequency easily, such that it is difficult to hear a high-pitched sound or is difficult to hear a low-pitched sound. The sound range adjustment function is particularly effective for the users having hearing difficulties, users with a decline in hearing, and users being in environment where it is difficult to hear the sound.

The contact data 9Y includes information for making contact with other persons. The contact data 9Y includes, for example, phone numbers of persons. The contact data 9Y may store a plurality of pieces of information on the same type of communication service associated with the same person, such as a home phone number, a company phone number, and a mobile phone number. The contact data 9Y may also include various types of personal information in addition to the information, such as a mail address, image data, an address, a place of work, and a birthday.

The control program 9A provides a function related to various controls for operating the smartphone 1. The control program 9A controls, for example, the communication unit 6, the receiver 7, and the microphone 8 to make a phone call. The function provided by the control program 9A includes a function for performing various controls such as a change of information displayed on the display 2A according to the gesture detected through the touch screen 2B. The functions provided by the control program 9A can be used in combination with a function provided by the other program such as the sound quality adjustment program 9B and the phone application 9C.

The controller 10 is a processor. Examples of the processor include, but are not limited to, a CPU (Central Processing Unit), SoC (System-on-a-chip), an MCU (Micro Control Unit), and an FPGA (Field-Programmable Gate Array). The controller 10 integrally controls the operations of the smartphone 1 to implement various functions.

Specifically, the controller 10 executes instructions contained in the program stored in the storage 9 while referring to the data stored in the storage 9 as necessary. The controller 10 then controls a function module according to the data and the instructions to thereby implement the various functions. Examples of the function module include, but are not limited to, the display 2A, the communication unit 6, the receiver 7, and the speaker 11. The controller 10 can change the control according to the detection result of a detector. Examples of the detector include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to perform the various controls such as the change of the information displayed on the display 2A according to the gesture detected through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a USB (Universal Serial Bus), an HDMI (registered trademark) (High-Definition Multimedia Interface), Light Peak (Thunderbolt (registered trademark)), and an earphone/microphone connector. The connector 14 may be a dedicated terminal such as a dock connector. Examples of the devices connected to the connector 14 include, but are not limited to, an external storage, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 4 may be downloaded from any other device through wireless communication by the communication unit 6. Part or all of the programs and the data stored in the storage 9 in FIG. 4 may be stored in the storage medium that can be read by a reading device included in the storage 9. Part or all of the programs and the data stored in the storage 9 in FIG. 4 may be stored in the storage medium that can be read by a reading device connected to the connector 14. Examples of the storage mediums include, but are not limited to, an optical disk such as CD (registered trademark), DVD (registered trademark), and Blu-ray (registered trademark), a magneto-optical disk, magnetic storage medium, a memory card, and solid-state storage medium.

The configuration of the smartphone 1 illustrated in FIG. 4 is only an example, and therefore it can be modified as required within a scope that does not depart from the gist of the present disclosure. For example, the number and the type of the button 3 are not limited to an example of FIG. 4. The smartphone 1 may be provided with buttons in a numeric keypad layout or QWERTY layout as buttons for screen operations, instead of the buttons 3A to 3C. The smartphone 1 may be provided with only one button for screen operations, or with no button. In an example illustrated in FIG. 4, the smartphone 1 is provided with two cameras; however, the smartphone 1 may be provided with only one camera or with no camera. In an example of FIG. 4, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Figure 5:
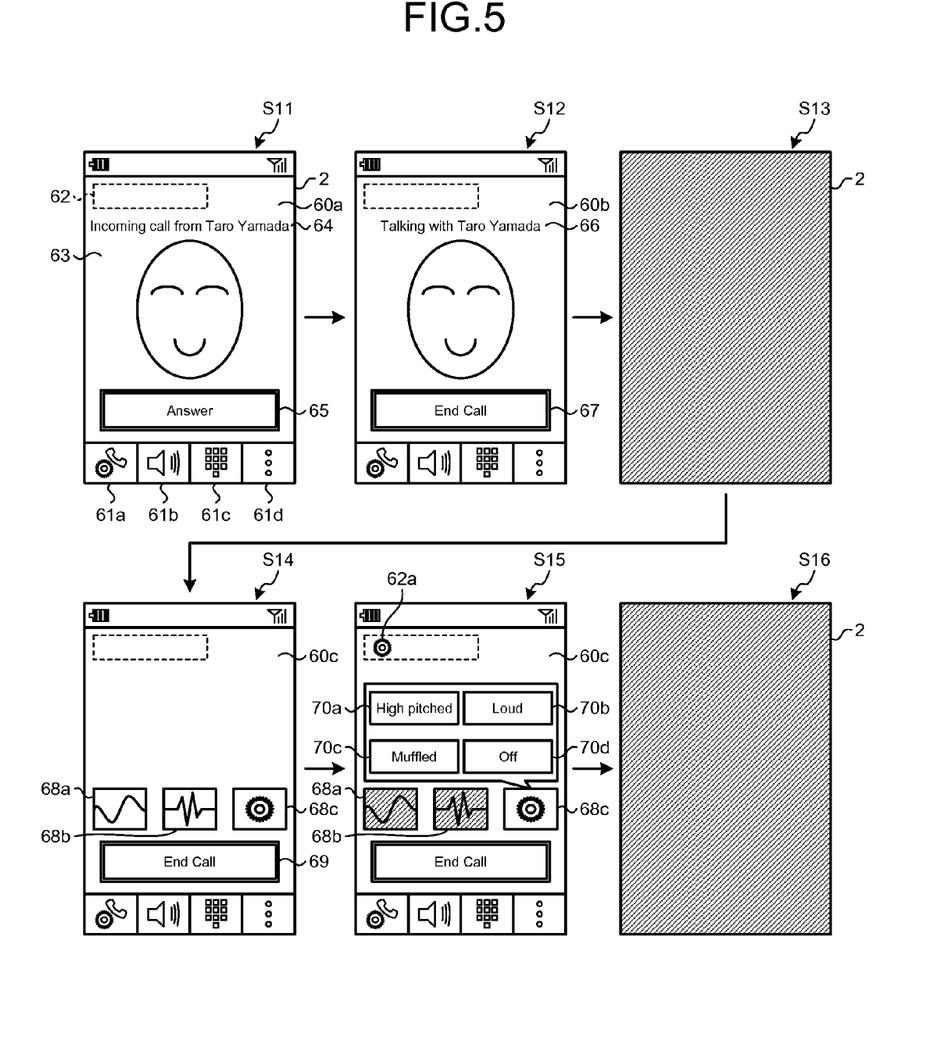
FIG. 5 is a diagram of an example of control for an incoming call by a smartphone according to an embodiment.

Control for an incoming call by the smartphone 1 will be explained with reference to FIG. 5. FIG. 5 is a diagram of an example of control for incoming call by the smartphone. In the following, the same components are assigned with the same reference signs and overlapping description may be omitted.

When detecting an incoming call from an electronic device of the counterpart, then at Step S11, the smartphone 1 displays an incoming call screen 60a showing an incoming call on the touch screen display 2 (display 2A). The smartphone 1 can inform the user of the incoming call using a ringtone, vibration, or blinking of a lamp along with the display of the incoming call screen 60a.

The incoming call screen 60a includes buttons 61a, 61b, 61c, 61d, and 65, and display areas 62, 63, and 64.

The button 61a is a button for setting the sound quality adjustment function. The button 61b is a button for changing an output destination of the sound from the receiver 7 to the speaker 11. The button 61c is a button for displaying a dial (keypad) including key objects corresponding to at least 10 numbers from "0" to "9" on the display 2A. The button 61d is a button for displaying a menu for calling various functions related to the phone call on the display 2A. The button 65 is a button for answering an incoming call. The button 65 may be an object for accepting other operations, in order to answer the incoming call, such as a drag instead of a tap.

In the incoming call screen 60a, each of the buttons 61a, 61b, 61c, and 61d is laid out in a small size along the lower end portion of the screen, and the button 65 is widely arranged above the buttons. Therefore, the user can easily perform answering which is the most important operation in the incoming call screen 60a. This makes it possible to quickly and surely answer the incoming call without keeping the counterpart waiting.

The display area 62 displays an icon corresponding to a function, among functions included in the quality adjustment function, which is enabled by the user. The display area 63 displays information on a counterpart. The display area 64 displays an incoming call message. In an example of FIG. 5, it is assumed that the counterpart is Taro Yamada registered in the contact data 9Y. In this case, as illustrated at Step S11, the smartphone 1 displays the image data for Taro Yamada registered in the contact data 9Y in the display area 63, and displays the name of Taro Yamada registered in the contact data 9Y as part of the message in the display area 64.

In the incoming call screen 60a, the display area 63 and the display area 64 occupy a large portion in the area of the incoming call screen 60a. This makes it possible for the user to quickly know who is calling.

In this way, the incoming call screen 60a is configured in a simple manner so that the user can quickly know who is calling and promptly and surely answer the call.

At Step S11, the user having noticed the incoming call taps the button 65 in the incoming call screen 60a to perform an off-hook operation. The off-hook operation is an operation for starting a call in response to the incoming call. When detecting the tap on the button 65, then at Step S12, the smartphone 1 starts call processing, and displays a talk screen 60b indicating "talking" on the display 2A. The call processing includes, for example, processing for outputting a sound signal transmitted from the counterpart through the receiver 7 or the like, processing for converting the user's voice to the sound signal and transmitting the sound signal to the counterpart, and processing for detecting end of the call.

The talk screen 60b includes the buttons 61a, 61b, 61c, and 61d, and a button 67, and the display areas 62 and 63, and a display area 66. The button 67 is a button for ending the call.

In the talk screen 60b, each of the buttons 61a, 61b, 61c, and 61d is laid out in a small size along the lower end portion of the screen, and the button 67 is widely arranged above the buttons. Therefore, the user can easily end the phone call which is the most important operation in the talk screen 60b. This makes it possible to quickly and surely end the call.

The display area 66 displays a message indicating "talking on the phone". At Step S12, to indicate that the counterpart during the call is Taro Yamada, the smartphone 1 displays image data for Taro Yamada in the display area 63, and displays the name of Taro Yamada as part of the message in the display area 66.

In the talk screen 60b, the display area 63 and the display area 66 occupy a large portion in the area of the talk screen 60b. This makes it possible to surely know who the user is talking with.

In this way, the talk screen 60b is configured in a simple manner so that it is possible for the user to quickly know who he/she is talking with and to promptly and surely end the talk.

Thereafter, the user brings the smartphone 1, where the talk screen 60b is displayed, close to his/her ear in order to listen to the counterpart's voice output from the receiver 7. When detecting the presence of an object in proximity through the proximity sensor 5, then At Step S13, the smartphone 1 becomes a state in which the display of the display 2A is turned off. In the state in which the display is turned off, the smartphone 1 turns off the display of the display 2A and disables the touch screen 2B. This makes it possible for the smartphone 1 to detect a contact of the user's ear or the like on the touch screen 2B as an operation performed on the screen, reduce the possibility of malfunction, and further reduce the power consumption.

The state in which the display of the display 2A is turned off during the call is different from, so-called a locked state. In the locked state, to reduce the malfunction of the smartphone 1 which is not used and reduce the power consumption, the display of the display 2A is turned off and the touch screen 2B is disabled. Therefore, the smartphone 1 displays a lock screen in order to check whether the user has an intention of starting the use of the smartphone 1 when the locked state is released. And when a predetermined operation is not detected during the display of the lock screen, the smartphone 1 does not return to its normal use state. On the other hand, in the state in which the display of the display 2A is turned off during the call, because it is assumed that the smartphone is in use, the smartphone 1 returns to the normal use state without display of the lock screen for checking the intention of starting the use.

When the voice of the counterpart on the phone call is difficult to be heard, the user sets the sound quality adjustment function. Setting of the sound quality adjustment function is performed through screen operation. When the user separates the smartphone 1 from the ear in order to perform the screen operation, the smartphone 1 detects that the object in proximity is no more present through the proximity sensor 5. When detecting, during the call, that the object in proximity is no more present, then at Step S14, the smartphone 1 re-displays the display 2A and enables the touch screen 2B. At this time, the smartphone 1 displays a screen for controlling the own device in relation to the phone call on the display 2A. As the screen for controlling the own device in relation to the phone call, the smartphone 1 displays, for example, a sound quality adjustment screen 60c on the display 2A.

The sound quality adjustment screen 60c is a screen for controlling sound quality of the counterpart's voice. The sound quality adjustment screen 60c is a screen different from the talk screen 60b displayed by the display 2A before the state in which the display of the display 2A is turned off. "Different screen" means a screen having a difference in any other element other than elements shared with other screen such as picts, icons, and buttons. "Screen having a difference in any other element" includes a screen to which other element is added, a screen from which other element is deleted, and a screen from which part of elements is deleted.

The sound quality adjustment screen 60c includes the buttons 61a, 61b, 61c, and 61d, and buttons 68a, 68b, 68c and 69, and the display area 62. The button 68a is a button for setting the speech speed conversion function. The button 68b is a button for setting a noise cancelling function. The button 68c is a button for setting the sound quality adjustment function. The button 69 is a button for ending the call.

In the sound quality adjustment screen 60c, each of the buttons 61a, 61b, 61c, and 61d is laid out in a small size along the lower end portion of the screen, and the button 69 is widely arranged above the buttons. The buttons 68a, 68b, and 68c are arranged in a more upward area where the display areas 63 and 64 are provided.

In this way, when re-displaying the display 2A during the call, the smartphone 1 displays the button corresponding to the sound quality adjustment function on the screen. By displaying the button corresponding to the sound quality adjustment function on the screen in the above way, the user can easily set the sound quality adjustment function during the call. Consequently, it can be achieved that the sound quality adjustment function is easily used.

When any one of the buttons 61b, 61c, and 61d is operated during display of the sound quality adjustment screen 60c, the smartphone 1 temporarily disables the sound quality adjustment function. When the button 61b is operated, the smartphone 1 temporarily disables the sound quality adjustment function until output of the voice from the speaker 11 is stopped. Thus, the voice adjusted for output from the speaker 11 is output from the speaker 11, and it is possible to avoid the situation in which it becomes difficult for the user to hear the voice. When the button 61c is operated, the smartphone 1 temporarily disables the sound quality adjustment function until the displayed keypad is deleted. Thus, it is possible to avoid the situation in which it becomes difficult for the user to hear the operation sound output from the speaker 11 or the like at the time of operating the keypad. When the button 61d is operated, the smartphone 1 temporarily disables the sound quality adjustment function until the displayed menu is closed. Thus, it is possible to avoid the situation in which it becomes difficult for the user to hear the sound output from the speaker 11 or the like caused by a function called from the menu. The temporarily disabled sound quality adjustment function may be enabled when the smartphone 1 is again returned to the state in which the display of the display 2A is turned off. Alternatively, the temporarily disabled sound quality adjustment function may be enabled when the presence of an object in proximity is detected by the proximity sensor 5.

Figure 9:
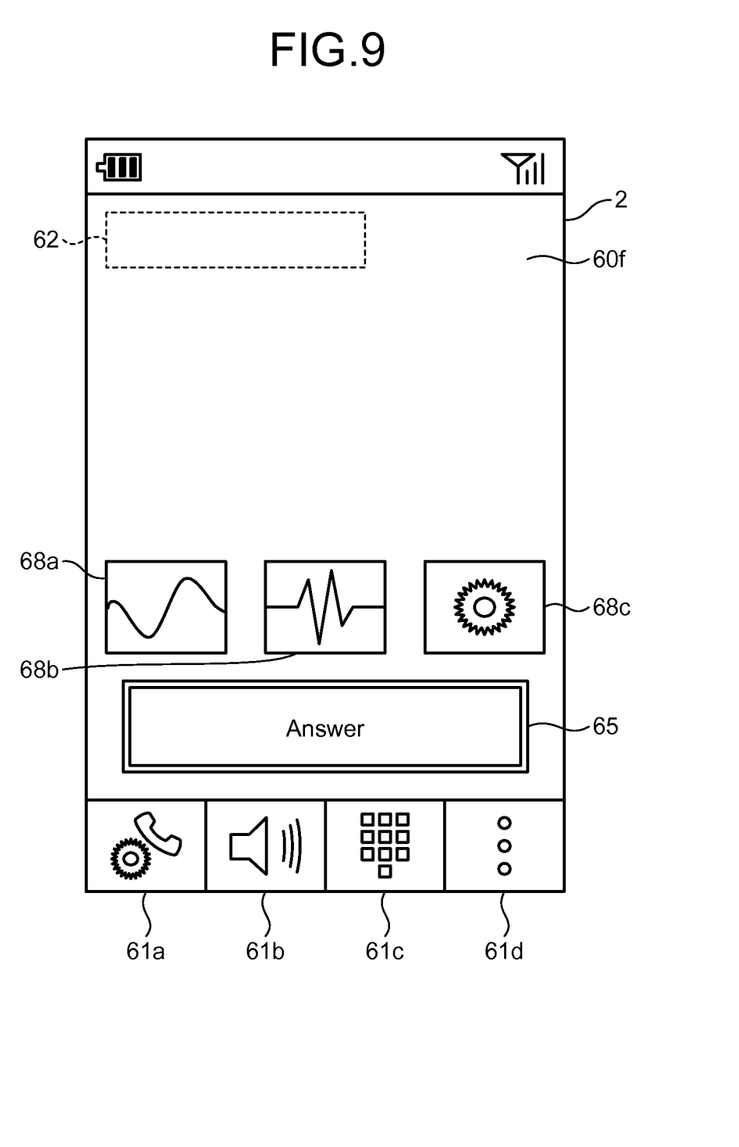
FIG. 9 is a diagram of an example of an incoming call screen configured so that sound quality adjustment can be set according to an embodiment.

When detecting an operation for the button 61a being the button for setting the sound quality adjustment function at the state of Step S11, the smartphone 1 changes the incoming call screen 60a to an incoming call screen 60f illustrated in FIG. 9. FIG. 9 is a diagram of an example of an incoming call screen configured so that sound quality adjustment can be set. The incoming call screen 60f is a screen in which the button 69 in the sound quality adjustment screen 60c is replaced with the button 65 for answering the incoming call. In this way, by displaying the incoming call screen 60f during the incoming call, the user can also set the sound quality adjustment function before the incoming call.

However, when the screen is changed to the incoming call screen 60f during the incoming call, the number of buttons laid out on the screen is increased, which makes it difficult to make a quick answer, and the time for keeping the counterpart waiting may be prolonged. In the first place, because it is not known how the counterpart's voice is heard at the stage before the arrival of the incoming call, the user does not figure out how to set the sound quality adjustment function. Moreover, because there are no display areas 63 and 64, it is not possible to determine who is calling. It is possible to add the display areas 63 and 64 to the incoming call screen 60f, but, in this case, the size of each element in the incoming call screen 60f has to be reduced, and a quick operation is thereby made further difficult.

When detecting an operation for the button 61a which is the button for setting the sound quality adjustment function in the state of Step S12 illustrated in FIG. 5, the smartphone 1 changes the talk screen 60b to the sound quality adjustment screen 60c. Thereby the user can also set the sound quality adjustment function before the start of phone conversation. However, because it is not known how the counterpart's voice is heard at the stage before the start of phone conversation, the user does not figure out how to set the sound quality adjustment function. Moreover, because there are no display areas 63 and 64, it is not possible for the user to determine who he/she is talking with.

Separation of the smartphone 1 with the sound quality adjustment function from the ear during the call means that it is quite possible that the user finds it difficult to hear the counterpart's voice and is about to use the sound quality adjustment function. In such a scene, the smartphone 1 can provide the screen that meets the user's intention to the user by displaying the sound quality adjustment screen 60c. Consequently, it can be achieved that the user effectively uses the sound quality adjustment function.

Furthermore, in such a scene, it can be expected to fully recognize who is the counterpart from the display in the incoming call screen 60a and in the talk screen 60b and from the voice heard during "talking". Therefore, by omitting the display areas 63 and 64 where information on the counterpart is displayed and arranging the buttons 68a, 68b, and 68c, it is possible to maintain the sound quality adjustment screen 60c as simple as possible. This makes it possible to reduce the possibility that malfunction such that the phone call is accidentally ended through an operation for the button 69 may occur although it is intended to set the sound quality adjustment function.

There is a space area between the buttons 68a, 68b, and 68c in the sound quality adjustment screen 60c and the display area 62. When any of the buttons 68a, 68b, and 68c is selected, a button for setting a more detailed function of the function corresponding to the selected button is displayed in the space area.

For example, when the user taps the button 68c, then at Step S15, the smartphone 1 displays buttons 70a, 70b, 70c, and 70d in the space area of the sound quality adjustment screen 60c. Furthermore, during the display of the buttons 70a, 70b, 70c, and 70d related to the button 68c, the smartphone 1 disables the buttons 68a and 68b which are not related to these buttons. To indicate that the buttons are disabled, the smartphone 1 changes a display mode of the buttons 68a and 68b. Changing the display mode includes, for example, lowering the brightness or saturation, hatching or grayout, and being transparent or translucent.

The button 70a has a label called "High-pitched", and is used to enable or disable a function of adjusting the volume of treble. The button 70b has a label called "Loud", and is used to enable or disable a function of adjusting the volume of midrange. The button 70c has a label called "Muffled", and is used to enable or disable a function of adjusting the volume of bass. The button 70d has a label called "Off", and is used to enable or disable the entire sound quality adjustment function.

In this way, a specific function is selected, and, thereafter, by displaying the button for setting a more detailed function of the function, it is possible to maintain the screen as simple as possible and reduce the possibility of malfunction. Furthermore, by disabling the buttons corresponding to the functions other than the selected function, it is possible to further reduce the possibility of malfunction.

The smartphone 1 displays an icon 62a corresponding to the sound quality adjustment function set by the user in the display area 62. When the setting of the sound quality adjustment function is finished, the user again brings the smartphone 1 close to the ear. When detecting the presence of the object in proximity through the proximity sensor 5, then at Step S16, the smartphone 1 becomes the state in which the display of the display 2A is turned off. The smartphone 1 then outputs the voice whose quality is adjusted according to the setting from the receiver 7.

In this way, when the display 2A is to be re-displayed during the call, the smartphone 1 displays a screen for setting various functions related to the phone call instead of the screen displayed before being turned off. Thereby the smartphone 1 can provide a screen for operating the various functions related to the phone call to the user when it is required by the user. As a result, the smartphone 1 allows the user to easily use the various functions related to the phone call. Moreover, the smartphone 1 can maintain the screen as simple as possible and reduce the possibility of malfunction.

Figure 6:
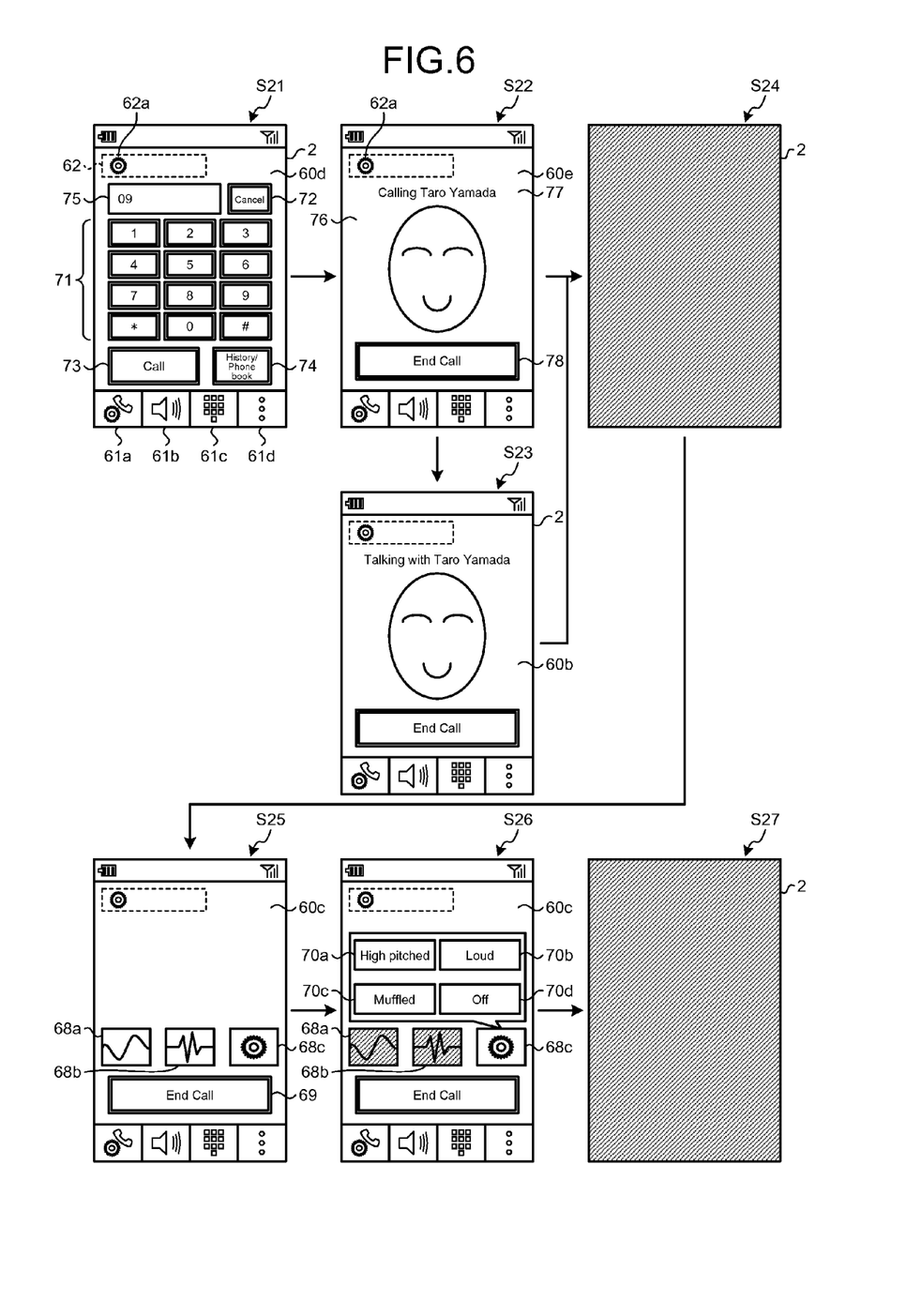
FIG. 6 is a diagram of an example of control for an outing call by a smartphone according to an embodiment.

The control for an outgoing call by the smartphone 1 will be explained next with reference to FIG. 6. FIG. 6 is a diagram of an example of the control for an outing call by the smartphone.

When detecting an operation of instructing an outgoing call, the smartphone 1 executes the phone application 9C. At Step S21, the smartphone 1 displays an outgoing call screen 60d for an outgoing call operation on the touch screen display 2 (display 2A) by executing the phone application 9C.

The outgoing call screen 60d includes the buttons 61a, 61b, 61c, and 61d, and buttons 72, 73, and 74, the display area 62, a keypad 71, and a dial display area 75. The keypad 71 includes key objects corresponding to at least 10 numbers from "0" to "9". The button 72 is a button for cancelling the outgoing call. The button 73 is a button for executing the outgoing call. The button 74 is a button for displaying a call history or a phone book. The dial display area 75 displays a phone number input through the keypad 71.

In an example, because the sound quality adjustment function is already enabled, the icon 62a corresponding to the sound quality adjustment function appears in the display area 62. The smartphone 1 may reproduce the state of the sound quality adjustment function set during the previous call at the time of outgoing call or incoming call. That is, the smartphone 1 may be configured to store the function enabled or disabled during a call and set the sound quality adjustment function based on the stored information when a next call is made. The smartphone 1 may also be configured to store the function enabled or disabled during a call in association with the counterpart and set the sound quality adjustment function based on the information stored in association with the counterpart when talking with the counterpart.

In the outgoing call screen 60d, each of the buttons 61a, 61b, 61c, and 61d is laid out in a small area of the lower end portion of the screen, and the keypad 71 and the buttons 73 and 74 are laid out in a wide area above the buttons. Therefore, the user can easily perform number input and an outgoing call which are most important operations in the outgoing call screen 60d.

When the setting of the phone number is completed, the user taps the button 73. When detecting the tap on the button 73, then at Step S22, the smartphone 1 displays a call screen 60e indicating "calling" on the display 2A, and performs outgoing call processing for the set phone number.

The call screen 60e includes the buttons 61a, 61b, 61c, and 61d, a button 78, the display area 62, and display areas 76 and 77. The button 78 is a button for ending the call. The display area 76 displays information on a called party. The display area 77 displays a message indicating "calling". In an example illustrated in FIG. 6, it is assumed that the called party is Taro Yamada registered in the contact data 9Y. In this case, as illustrated at Step S22, the smartphone 1 displays the image data for Taro Yamada registered in the contact data 9Y in the display area 76, and displays the name of Taro Yamada registered in the contact data 9Y as part of the message in the display area 77.

In the call screen 60e, the display area 76 and the display area 77 occupy a large portion in the area of the call screen 60e. This makes it possible to quickly know whom the user is calling.

In this way, the call screen 60e is configured in a simple manner so that whom the user is calling is quickly known and the call can be promptly and reliably ended.

Thereafter, the user brings the smartphone 1, where the call screen 60e is displayed, close to the ear in order to listen to the voice of the counterpart output from the receiver 7. When detecting the presence of the object in proximity through the proximity sensor 5, then at Step S24, the smartphone 1 becomes the state in which the display of the display 2A is turned off. When the called party answers the incoming call in the state in which the display is turned off and the phone call is established, the smartphone 1 starts the call processing.

When the called party answers the incoming call before becoming the state in which the display of the display 2A is turned off and the phone call is established, then at Step S23, the smartphone 1 starts the call processing and displays the talk screen 60b on the display 2A. As is already described, the talk screen 60b is configured in a simple manner so that it is quickly known who the user is talking with and the talk can be promptly and reliably ended. Thereafter, when the user brings the smartphone 1 close to the ear, the smartphone 1 detects the presence of the object in proximity through the proximity sensor 5, and, at Step S24, becomes the state in which the display of the display 2A is turned off.

When the voice of the counterpart on the phone call is difficult to be heard, the user changes the setting of the sound quality adjustment function. Changing the setting of the sound quality adjustment function is performed through the screen operation. When the user separates the smartphone 1 from the ear in order to perform the screen operation, the smartphone 1 detects that the object in proximity is no more present through the proximity sensor 5. When detecting, during the call, that the object in proximity is no more present, then at Step S25, the smartphone 1 re-displays the display 2A and enables the touch screen 2B. At this time, the smartphone 1 displays the screen for controlling its own device in relation to the phone call on the display 2A. As the screen for controlling the own device in relation the phone call, the smartphone 1 displays, for example, the sound quality adjustment screen 60c on the display 2A.

In this way, when the display 2A is to be re-displayed during the call, the smartphone 1 displays the sound quality adjustment screen 60c having the button corresponding to the sound quality adjustment function. By displaying the button corresponding to the sound quality adjustment function on the screen in the above manner, the user can easily set the sound quality adjustment function during the call. Consequently, it can be achieved that the sound quality adjustment function is easily used.

For example, when the user taps the button 68c, then at Step S26, the smartphone 1 displays the buttons 70a, 70b, 70c, and 70d in the space area of the sound quality adjustment screen 60c. Furthermore, during the display of the buttons 70a, 70b, 70c, and 70d related to the button 68c, the smartphone 1 disables the buttons 68a and 68b not related to these buttons. To indicate that the buttons are disabled, the smartphone 1 changes the display mode of the buttons 68a and 68b.

When the setting change of the sound quality adjustment function is finished, the user again brings the smartphone 1 close to the ear. When detecting the presence of the object in proximity through the proximity sensor 5, then at Step S27, the smartphone 1 becomes the state in which the display of the display 2A is turned off. The smartphone 1 then outputs the voice whose quality is adjusted according to the setting from the receiver 7.

In this way, when the display 2A is to be re-displayed during the call, the smartphone 1 displays the screen for setting the various functions related to the phone call instead of the screen displayed before the display of the display 2A is turned off. Thereby the smartphone 1 can provide the screen for operating the various functions related to the phone call to the user when it is required by the user. As a result, the smartphone 1 allows the user to easily use the various functions related to the phone call. Moreover, the smartphone 1 can maintain the screen as simple as possible and reduce the possibility of malfunction.

Figure 7:
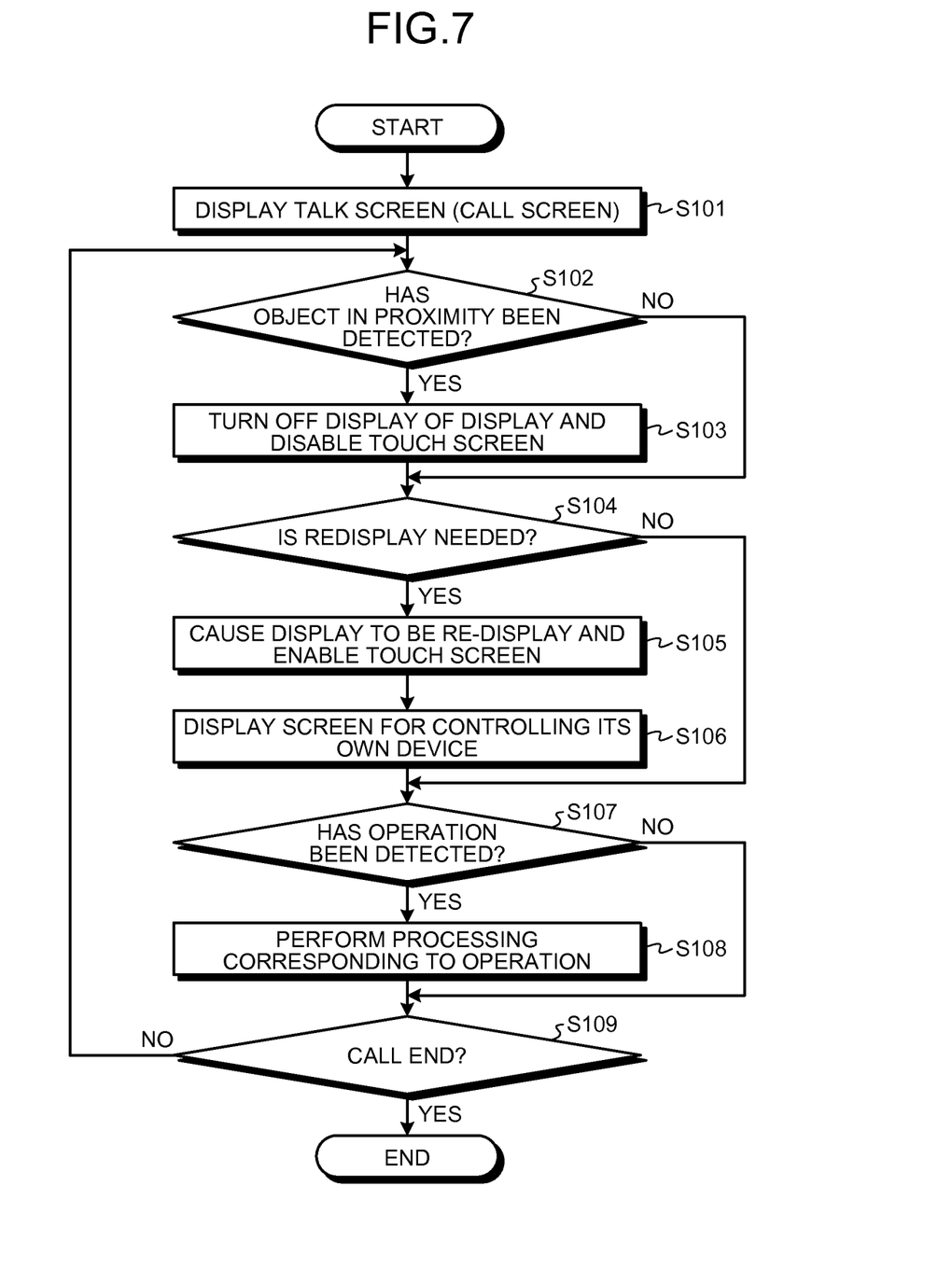
FIG. 7 is a flowchart of an example of a procedure of a control by a smartphone according to an embodiment.

A procedure of the control by the smartphone 1 will be explained with reference to FIG. 7. FIG. 7 is a flowchart of an example of the procedure of the control by the smartphone. The procedure illustrated in FIG. 7 is implemented by the controller 10 executing the control program 9A. The controller 10 displays the incoming call screen 60a or the outgoing call screen 60d on the display 2A before the procedure illustrated in FIG. 7 is performed.

As illustrated in FIG. 7, at Step S101, the controller 10 of the smartphone 1 causes the talk screen 60b (or the call screen 60e) to be displayed on the display 2A. Specifically, the controller 10 causes the talk screen 60b to be displayed on the display 2A during talking due to the incoming call or the outgoing call, and causes the call screen 60e to be displayed on the display 2A during calling due to the outgoing call.

At Step S102, the controller 10 determines whether the object in proximity has been detected. When the object in proximity has been detected (Yes at Step S102), the controller 10 proceeds to Step S103. At Step S103, the controller 10 causes the display of the display 2A to be turned off and the touch screen 2B to be disabled. When the object in proximity has not been detected (No at Step S102), the controller 10 does not perform Step S103.

At Step S104, the controller 10 determines whether redisplay of the display 2A is needed. For example, when the presence of the object in proximity is not detected by the proximity sensor 5, the controller 10 determines that redisplay of the display 2A is needed. When redisplay of the display 2A is needed (Yes at Step S104), the controller 10 proceeds to Step S105. At Step S105, the controller 10 causes the display 2A to be re-displayed and the touch screen 2B to be enabled. At Step S106, the controller 10 causes the screen for controlling the own device to be displayed on the display 2A. When redisplay of the display 2A is not needed (No at Step S104), the controller 10 does not perform Step S105 and Step S106.

At Step S107, the controller 10 determines whether an operation has been detected. For example, when a gesture for the sound quality adjustment screen 60c has been detected through the touch screen 2B, the controller 10 determines that the operation has been detected. When the operation has been detected (Yes at Step S107), the controller 10 proceeds to Step S108. At Step S108, the controller 10 performs the processing corresponding to the detected operation. For example, when detecting an operation for enabling the sound quality adjustment function, the controller 10 adjusts the sound quality of the counterpart's voice output from the receiver 7 according to the detected operation through the function provided by the sound quality adjustment program 9B. When the operation has not been detected (No at Step S107), the controller 10 does not perform Step S108.

At Step S109, the controller 10 determines whether the call has been ended. Specifically, when a user's operation of ending the call is detected or when the call is ended, the controller 10 determines the operation as call end. When it is the call end (Yes at Step S109), the controller 10 ends the procedure illustrated in FIG. 7. When it is not the call end (No at Step S109), the controller 10 re-executes Step S102 and subsequent steps.

An embodiment disclosed in the present application can be modified within a scope that does not depart from the gist and the scope of the disclosure. Moreover, an embodiment and modifications thereof disclosed in the present application can be combined with each other if necessary. For example, an embodiment may be modified as follows.

For example, the programs illustrated in FIG. 4 may be divided into a plurality of modules, or may be combined with any other program.

An embodiment has explained an example in which the smartphone 1 re-displays the display 2A when the object in proximity is no more detected by the proximity sensor 5. However, the condition of re-displaying the display 2A is not limited thereto. For example, when any one of the buttons 3A to 3F is operated, the smartphone 1 may re-display the display 2A. When detecting a change in an attitude of the smartphone 1 based on a detection result of an attitude sensor (at least one of the acceleration sensor 15, the direction sensor 16, and the gyroscope 17), the smartphone 1 may re-display the display 2A. When a sound output device connected to the connector 14 is removed, the smartphone 1 may re-display the display 2A. When a connection with the sound output device connected through short range communication such as Bluetooth (registered trademark) is disconnected, the smartphone 1 may re-display the display 2A. The sound output device includes, for example, a speaker, a headphone, an earphone, and a head set.

An embodiment has explained an example of displaying the sound quality adjustment screen 60c as the screen for controlling the own device when the display 2A is to be re-displayed. However, the screen for controlling the own device is not limited thereto. The screen for controlling the own device may be a screen related to a phone call other than the sound quality adjustment such as a recoding screen of the phone call. The screen for controlling the own device may be a screen not related to the phone call such as a screen for displaying a stored schedule.

An embodiment has explained an example of displaying the buttons 61a, 61b, 61c, and 61d, which are the same as these in the other screens, in the sound quality adjustment screen 60c. However, the smartphone 1 may display a button, which is different from that of the other screens, in the sound quality adjustment screen 60c. An example of displaying a button, which is different from that of the other screens, in the sound quality adjustment screen 60c will be explained below with reference to FIG. 8.

Figure 8:
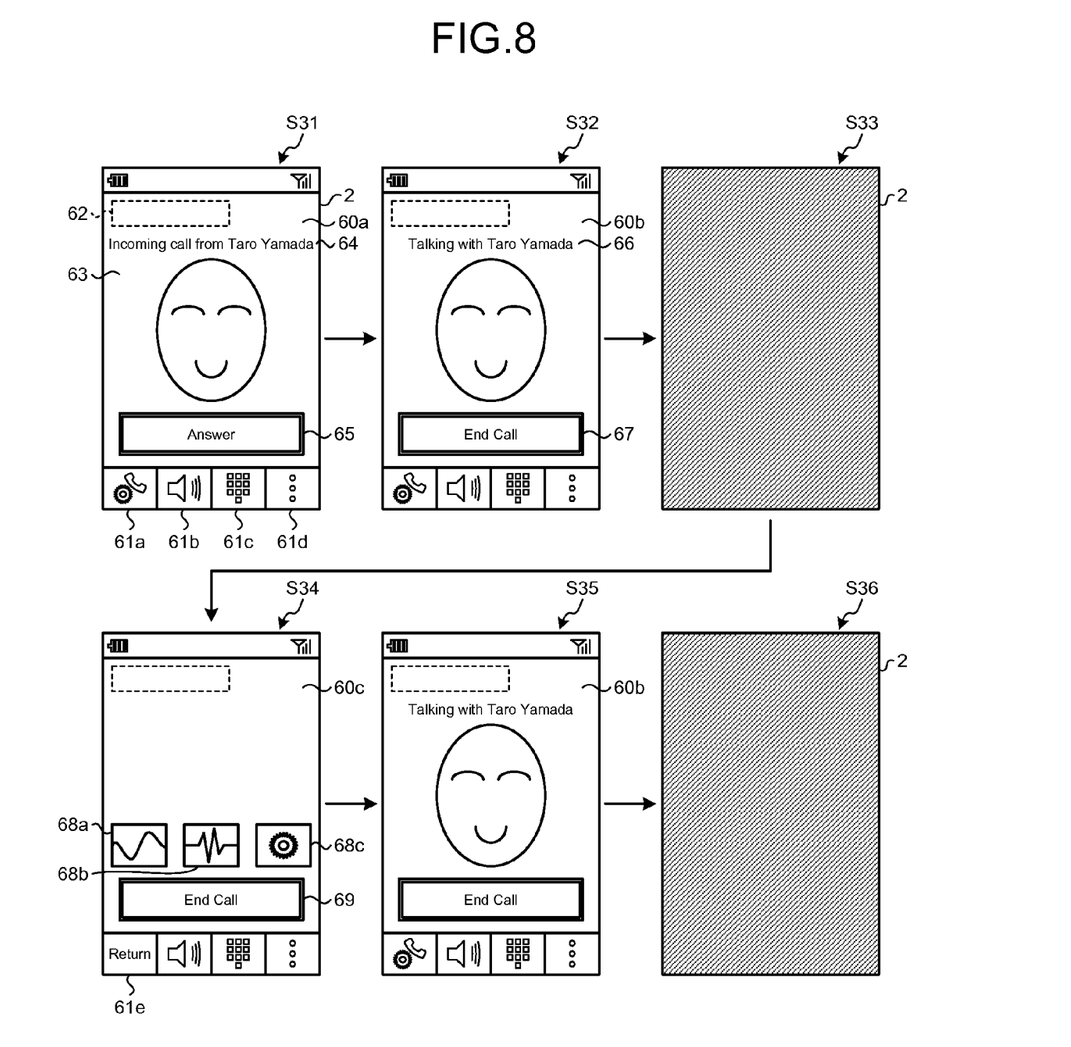
FIG. 8 is a diagram of another example of a control for an incoming call by a smartphone according to an embodiment.

FIG. 8 is a diagram of another example of the control for the incoming call by the smartphone. Because Step S31 to Step S33 illustrated in FIG. 8 are the same as Step S11 to Step S13 illustrated in FIG. 5, explanation thereof is omitted.

When detecting that no object in proximity is present during the call in the state of Step S33, then at Step S34, the smartphone 1 re-displays the display 2A and enables the touch screen 2B. At this time, the smartphone 1 displays the sound quality adjustment screen 60c on the display 2A.

The smartphone 1 displays the sound quality adjustment screen 60c including the buttons 68a, 68b, and 68c in the state of Step S34, and therefore there is no need to display the button 61a. For this reason, the sound quality adjustment screen 60c is configured to include a button 61e instead of the button 61a. The button 61e has a label called "Return", and is used to return from the sound quality adjustment screen 60c to the talk screen 60b.

When detecting a tap for the button 61e, then at Step S35, the smartphone 1 re-displays the talk screen 60b on the display 2A. Thereafter, when detecting the presence of the object in proximity through the proximity sensor 5, then at Step S36, the smartphone 1 becomes the state in which the display of the display 2A is turned off.

In this way, when the display 2A is to be re-displayed, the smartphone 1 displays the screen including the button for performing an operation of returning to the talk screen 60b. This allows the user to return the sound quality adjustment screen 60c to the talk screen 60b only by operating the button 61e when the sound quality adjustment is not needed.

The case in which the button 61e corresponding to "Return" is displayed in the sound quality adjustment screen 60c has been explained with reference to FIG. 8; however, the button displayed in the sound quality adjustment screen 60c is not limited thereto. For example, the smartphone 1 may be configured to display a toggle button in the sound quality adjustment screen 60c and change a plurality of functions through an operation.

An embodiment has explained the case in which the smartphone 1 displays the three buttons 68a, 68b, and 68c in the sound quality adjustment screen 60c. However, when other phone call mode different from the phone call through the receiver 7 is used, the smartphone 1 may configure the sound quality adjustment screen 60c so as to change the number of displays of operation buttons corresponding to the other phone call mode. The other phone call mode includes phone call modes such as a phone call using a speaker phone, a phone call using a connected earphone, and a phone call using a headset through short range wireless communications. The smartphone 1 detects that the phone call is in other phone call mode, and displays the button corresponding to the detected phone call mode in the sound quality adjustment screen 60c. For example, when the other phone call mode is a phone call using a speaker phone, the smartphone 1 displays only the button 68a or only the buttons 68a and 68c in the sound quality adjustment screen 60c.

An embodiment has explained the case in which the smartphone 1 displays the buttons 68a, 68b, and 68c, and the buttons 61a, 61b, 61c, and 61d in the sound quality adjustment screen 60c. However, the smartphone 1 may be configured so as not to accept a gesture for any of the buttons 61a, 61b, 61c, and 61d when the buttons 70a, 70b, 70c, and 70d are displayed in the sound quality adjustment screen 60c.

The smartphone 1 may be configured so as to be capable of changing the type and the display position of each of buttons, icons, and the like appearing when the display 2A is displayed during the call, based on the user setting.

An embodiment has explained the smartphone as an example of the mobile electronic device; however, the mobile electronic device according to the appended claims is not limited to the smartphone. The mobile electronic device according to the appended claims may be a mobile electronic device with any phone call function other than the smartphone. Examples of the mobile electronic devices with the phone call function include, but are not limited to, mobile phones, tablets, mobile personal computers, digital cameras, media players, electronic book readers, navigators, and gaming devices.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising:
    a communication unit configured to perform communication for a phone call;
    a display configured to display a first screen during a phone call made by the communication unit;
    a proximity sensor; and
    a controller configured to
       during the phone call,
       turn off the display with the first screen being displayed thereon, when the proximity sensor detects a presence of an object in proximity of the display,
       after the display has been turned off, determine that redisplaying is needed when the proximity sensor no longer detects the presence of the object in proximity of the display, and
       display a second screen different from the first screen on the display when redisplaying is determined to be needed.

2. The mobile electronic device according to claim 1, wherein the second screen contains a screen for controlling the mobile electronic device.

3. The mobile electronic device according to claim 1, wherein the second screen contains a screen for controlling various functions related to the phone call of the mobile electronic device.

4. A control method of a mobile electronic device that includes a communication unit,
    a proximity sensor, and
    a display, the control method comprising:
    performing communication for a phone call made by the communication unit; and
    during the phone call made by the communication unit, displaying a first screen on the display,
    turning off the display with the first screen being displayed thereon, when the proximity sensor detects a presence of an object in proximity of the display,
    after the display has been turned off, determining that redisplaying is needed when the proximity sensor no longer detects the presence of the object in proximity of the display, and
    displaying a second screen different from the first screen on the display when redisplaying is determined to be needed.

5. The control method according to claim 4, wherein the second screen contains a screen for controlling the mobile electronic device.

6. The control method according to claim 4, wherein the second screen contains a screen for controlling various functions related to the phone call of the mobile electronic device.

7. A computer program product having computer instructions, stored on a non-transitory computer readable storage medium, for enabling a computer of a mobile electronic device including a communication module,
    a proximity sensor, and
    a display executing the computer instructions to perform operations comprising:
    performing communication for a phone call made by the communication unit; and
    during the phone call made by the communication unit, displaying a first screen on the display,
    turning off the display with the first screen being displayed thereon, when the proximity sensor detects a presence of an object in proximity of the display,
    after the display has been turned off, determining that redisplaying is needed when the proximity sensor no longer detects the presence of the object in proximity of the display, and
    displaying a second screen different from the first screen on the display when redisplaying is determined to be needed.

8. The computer program product according to claim 7, wherein the second screen contains a screen for controlling the mobile electronic device.

9. The computer program product according to claim 7, wherein the second screen contains a screen for controlling various functions related to the phone call of the mobile electronic device.

* * * * *